July 13, 1926.
V. A. BRANDT
NUT LOCKING WASHER
Filed Feb. 11, 1926
1,592,438
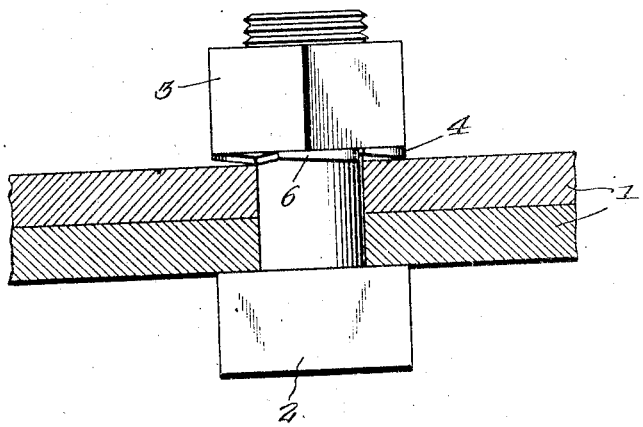
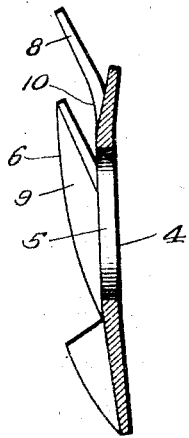
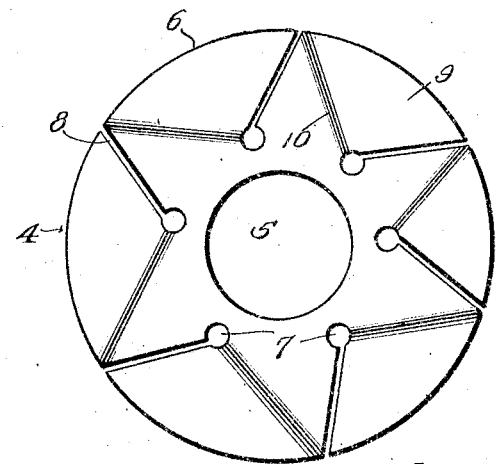
Inventor
V. A. Brandt,
By Clarence A. O'Brien
Attorney Patented July 13, 1926.

1,592,438

UNITED STATES PATENT OFFICE.

VILAS A. BRANDT, OF STAR PRAIRIE, WISCONSIN.

NUT-LOCKING WASHER.

Application filed February 11, 1926. Serial No. 87,589.

My present invention has to do with the locking of nuts and the like through the medium of washers interposed between the nuts and confronting surfaces; and it has for its object the provision of a simple, inexpensive and efficient nut locking washer possessed of the practical advantages hereinafter ascribed to it.

The invention in all of its details will be fully understood from the following description and claims when the same are read in connection with the drawings, accompanying and forming part of this specification, in which:—

Figure 1 is a view partly in section and partly in elevation, illustrating my novel washer in edge elevation as interposed between a nut and a fish plate.

Figure 2 is a diametrical section of my novel washer per se.

Figure 3 is a side elevation of the washer per se.

Similar numerals of reference designate corresponding parts in all of the views of the drawings.

I show in Figure 1 plates 1 associated with a headed bolt 2 and a nut 3 and I also show in said figure my novel washer, generally designated by 4, as surrounding the shank of the bolt 2 and as interposed between the inner side of the nut 3 and the confronting face of one of the plates 1. The showing in Figure 1 constitutes merely one use to which my novel washer 4 may be put.

My novel washer is formed in appropriate manner of a single piece of appropriate metal, and is possessed of resiliency. The washer is characterized by a central bolt receiving aperture 5, by a circular edge 6 and by a circular series of comparatively small apertures 7, grouped about and spaced from the central aperture 5 and spaced apart but not equi-distant. In this latter connection it will be noted from Figure 3 that the spaces between the comparatively small apertures 7 vary slightly in length. My novel washer is also characterized by cuts 8 which extend from the small apertures 7 to the perimeter of the washer and are disposed tangentially with respect to the central circular aperture 5. Between the said cuts 8 the washer has resilient arms 9, the said arms 9 being bent laterally on the lines 10 and being so arranged that half of the arms 9 are deflected in one direction from the plane of the central portion of the washer, and the other half of the arms are deflected laterally in the opposite direction from the plane of the central portion of the washer. By virtue of this relative arrangement of the arms 9 it will be manifest that one-half of the said arms 9 will exert pressure against and frictionally engage the opposed face of a nut or the like so as to preclude casual turning of the nut, while the remainder of the arms 9 by exerting pressure against an opposed surface as one of the plates 1, will preclude casual turning of the washer or, in other words, will anchor the washer to the opposed plate or surface. With a view to contributing to the resiliency and the strength of the arms 9, the washer is tapered or reduced in thickness gradually from the large central aperture 5 outwardly, as appears in Figure 2.

It will be appreciated from the foregoing that notwithstanding the practical advantages ascribed to my novel nut locking washer, the washer is simple in construction, is susceptible of being economically used, is adapted to be applied with facility, and is free of weak parts such as are likely to get out of order after a short period of use.

Having described my invention, what I claim and desire to secure by Letters-Patent, is:—

As a new article of manufacture, a resilient, nut locking washer, of general circular form, characterized by a central bolt receiving aperture, by a circular series of small apertures spaced apart and grouped about and spaced from the large central aperture, tangentially disposed cuts extending from the said small apertures to the perimeter of the washer, and arms deflected laterally from the plane of the central portion of the washer; one half of the said arms being deflected in one direction from said plane and the other half being deflected in the opposite direction from the plane; the said washer being tapered or gradually reduced in thickness from its central portion to its perimeter, and the point of deflection of the oppositely directed arms being at acute angles to the tangential cuts and each extending from the outer end of one tangential cut to a small aperture at one side of the said cut.

In testimony whereof I affix my signature.

VILAS A. BRANDT.